Figure 1:
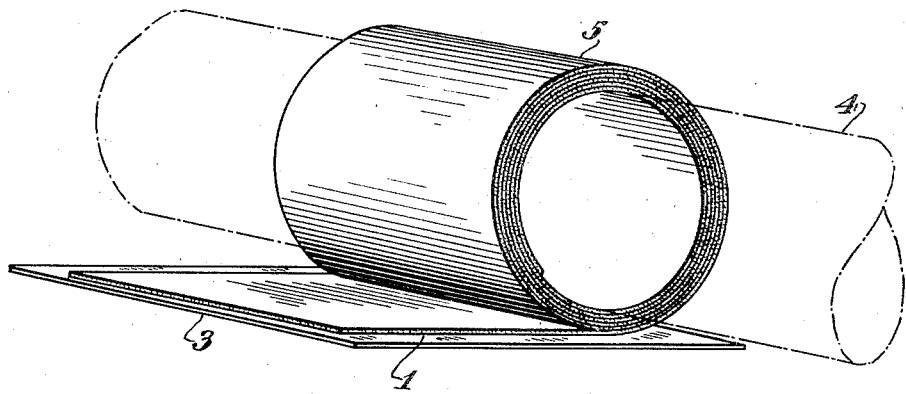
Figure 2:
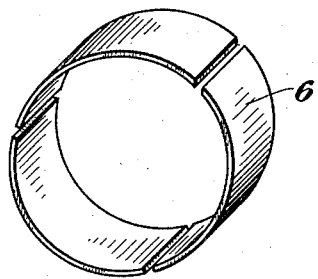
Figure 3:
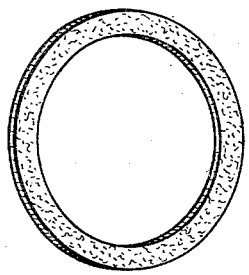

July 24, 1934.   S. COLLIER ET AL   1,967,224

FRICTION ELEMENT AND METHOD OF MAKING THE SAME

Filed Oct. 25, 1932

INVENTORS.
Simon Collier.
Ralph H. Soulis.
BY
D. N. Halstead
ATTORNEY

Patented July 24, 1934

1,967,224

UNITED STATES PATENT OFFICE 1,967,224

FRICTION ELEMENT AND METHOD OF MAKING THE SAME

Simon Collier, Waukegan, Ill., and Ralph H. Soulis, Detroit, Mich., assignors to Johns-Manville Corporation, New York, N. Y., a corporation of New York Application October 25, 1932, Serial No. 639,466

18 Claims. (Cl. 92—67)

The present invention relates to improvements in friction elements adapted for use as brake lining and clutch facing material, and particularly to such elements wherein the body portion is composed largely of Portland cement, or similar material. The invention includes both a novel product and method of producing the same.

This invention is an improvement on that disclosed in U. S. Patent 1,559,146—P. A. Andrews— patented October 27, 1925, which patent in its specific aspect contemplated the production of friction elements by a moulding operation from a mixture including asbestos fibers, Portland cement, and water in amount insufficient to cause plasticity. In elements so produced the fibers were not felted and of course had no definite arrangement with respect to each other.

We have ascertained that greatly improved results both with respect to the adaptability of the product for use as a brake lining or similar friction elements, and economies in production may be obtained by fabricating the elements from a relatively wet mixture of Portland cement and asbestos fibers and preferably by a procedure wherein the cement and fibrous inclusions are formed into a felted structure and preferably into a felted structure composed of a number of superimposed felted sheets or webs.

In the manufacture of friction elements according to our invention in its preferred embodiment, a pulp is first formed of Portland cement and asbestos fibers in a suitable amount of water. The pulp is next formed into a felted mass by a suitable paper or web-forming apparatus, and the felted mass either before or after hardening of the cement is cut or shaped into the requisite shapes for use as brake lining or clutch facing elements. Substances adapted to water-proof and/or alter the frictional characteristics of the asbestos and Portland cement are preferably associated therewith.

The advantages and the method of applying our invention will be apparent from the following description of a representative embodiment taken in connection with the accompanying drawing, wherein Fig. I—illustrates diagrammatically the method and means employed for forming the felted body of cement and fibers.

Figs. II and III—illustrate, respectively, a brake lining and a clutch facing made according to our invention.

In manufacturing our improved friction elements, the first step consists in the formation of a thin felted sheet or web I comprising a mixture of Portland cement together with a sufficient amount of fibrous material such as asbestos fibers to render possible the felting of the mixture and to provide the requisite degree of reinforcement in the friction element. This web may be formed from a pulp of the cement and fibers upon various kinds of paper making or wet-process machines, the construction and modes of operation of which are well known in the art.

A water pulp containing about 4% of solids consisting of about 85% of Portland cement and 15% of asbestos fibers has been employed with good results. The asbestos fibers may be supplemented or replaced by various other fibrous materials or filamentous inclusions such as mineral wool, vegetable fibers, metallic threads of brass, lead, or other metals, and the like. However, we regard asbestos fibers as by far the most desirable material. The Portland cement also may be supplemented or replaced by various other kinds of inorganic cementitious material, particularly other types of hydraulic cements, such as natural hydraulic cement. Portland cement, however, has been found to impart particularly desirable frictional characteristics to the product.

A substance adapted to water-proof and/or advantageously modify the friction characteristics of the cement-fiber product may be admixed with the pulp or the product may be subsequently impregnated with the waterproofing substance. A wide variety of such substances are available, as for example, a drying oil such as tung oil, soya bean oil, linseed oil and perilla oil, asphaltic and bituminous materials.

The pulp may be fabricated into a continuous web in the usual manner on a conventional type of wet-process machine comprising a revolving cylinder mold or pick-up roll mounted in a vat containing the pulp. The matted fiber is transferred from the roll on to a continuous felt band 3 by means of a pressure roll, and may be partially dried by passing the felt band over suitable vacuum boxes. The web thus formed is finally transferred from the felt band 3 on to a rotating mandrel 4 and wound up into the form of a cylindrical body or shell 5. This operation is illustrated diagrammatically in Fig. I. Strands or sheets of reinforcing material such as metal wire or netting may be incorporated by winding it up in concentric layers with the web. In practice, variable pressure rolls are ordinarily disposed about the mandrel and under the felt band to assist in the transfer of the web on to the mandrel and to compact the shell to the requisite density during its formation. However, such rolls are not essential. These devices are conventional and hence have not been illustrated.

In the production of brake lining, the mandrel preferably employed has approximately the same radius of curvature as the drum upon which the lining is to be employed. After the shell has been built up to the requisite thickness, that is, to a thickness slightly greater than that of the desired lining to allow for grinding and similar finishing operations, and has set sufficiently to permit of the necessary mechanical handling, it is cut into brake lining segments 6 as shown in Fig. II.

Clutch facing elements such as that illustrated in Fig. III may be made by employing a mandrel having the same diameter as the inner diameter of the ring and then after the cylindrical shell has attained the same diameter as the ring, it may be cut into rings by cutting planes perpendicular to the axis of the cylinder.

If desired, the shell may be first slit longitudinally and developed into a flat sheet prior to cutting the friction elements such as clutch facings and brake linings therefrom. However, this method lacks the advantages inherent in the above described methods.

The elements are permitted to air dry for about 48 hours and in some instances it may be found desirable to permit them to cure under water for about 7 to 8 days after which they may be machined to size.

In the event that no water-proofing or friction modifying agent has been introduced into the pulp such agent or agents may be incorporated by impregnation, for example, the elements may be waterproofed and have their frictional characteristics advantageously modified by immersing them in a bath of tung oil in a solvent of gasoline at a temperature of about 260-270° F. for about 24 hours. Various other water-proofing and friction modifying agents may be introduced in a similar manner.

The friction elements provided by our invention constitute a very marked advance over those now available due to their high resistance to heat, and uniform resistance to wear and mechanical stresses, and their surprising freedom from a tendency to cause scoring which ordinarily would be expected from an element constituted principally of Portland cement ordinarily classified as an abrasive.

While the above described method is regarded as the preferred embodiment of the invention, certain of its advantages may be obtained by other procedures. For instance, a product similar to that above described in that that a predominating amount of the fibrous inclusions extend in the same direction in the final product may be made by extruding a mixture of the same ingredients but having only a sufficient amount of water to provide a mass of plastic or doughy consistency, thru an extrusion machine provided with suitably shaped dies. Water-proofing and friction-modifying agents may be introduced into the plastic mass prior to the extruding or other type of molding operation or the product may be subsequently impregnated or treated with said agents. Sufficient water is employed with mixtures molded by this method to make them plastic and to completely set the cement. The cement is preferably used in major amount, preferably about 60-85%, and the asbestos fiber in amounts of 5-15%.

In place of forming the improved composition by a felting or extruding operation, it may be molded in a suitable form of hydraulic press. The press is provided with a mold, preferably of the same length and width as the desired friction element and having a bottom formed of a fine meshed wire cloth, or some other suitable type of perforated membrane. The pulp containing asbestos, Portland cement, and water is introduced into the mold, and compacted by the piston or die which is rammed into the top of the mold, thereby densifying the mixture to the desired extent and forcing the excess water thru the perforations in the bottom of the mold.

What we claim is:

1. A process of making brake lining and clutch facings which comprises forming a pulp of water, Portland cement, a friction modifying agent, and asbestos fibers, fabricating the pulp into a body having a felted structure, and cutting the felted body into shapes adapted for use as brake linings and clutch facings.

2. A process of making brake lining and clutch facings which comprises forming a pulp of water, Portland cement, asbestos fibers, fabricating the pulp into a body having a felted structure, and associating a waterproofing substance therewith.

3. A process of making brake lining and clutch facings which comprises forming a pulp of water, Portland cement and asbestos fibers, fabricating the pulp into a body having a felted structure, and associating an agent therewith adapted to modify the friction characteristics of the cement and asbestos.

4. A process of making friction elements such as brake linings and clutch facings which comprises forming a pulp of Portland cement, a friction modifying agent, and asbestos fibers, felting the pulp into a sheet or web, winding the web into a hollow cylindrical body, and cutting said body into shapes adapted for use as friction elements.

5. A process of making friction elements such as brake linings and clutch facings which comprises forming a pulp of Portland cement, and asbestos fibers, felting the pulp into a sheet or web, winding the web into a hollow cylindrical body, cutting said body into shapes adapted for use as friction elements, and impregnating the elements with a friction modifying agent.

6. A friction element adapted for use as a brake lining or clutch facing comprising an intimate and hardened felted mixture of Portland cement, a friction modifying agent, and asbestos fibers.

7. A friction element adapted for use as a brake lining or clutch facing comprising an intimate and hardened felted mixture of Portland cement, a drying oil, and fibrous material.

8. A friction element adapted for use as a brake lining or clutch facing comprising an intimate and hardened felted mixture of Portland cement, fibrous material, and a waterproofing substance.

9. A friction element adapted for use as a brake lining or clutch facing comprising an intimate and hardened felted mixture of Portland cement, a friction modifying agent, and asbestos fibers, the cement being present in said mixture in major amount.

10. A friction element adapted for use as a brake lining or clutch facing comprising a hardened mass composed of a multiplicity of superimposed felted webs of Portland cement, a friction modifying agent, and fibrous material.

11. A friction element adapted for use as a brake lining or clutch facing comprising an intimate and hardened felted mixture of a hydraulic cement, a drying oil, and fibrous material.

12. A friction element adapted for use as a brake lining or clutch facing comprising an intimate and hardened felted mixture of Portland cement, asbestos fibers and a friction modifying agent.

13. A process of making brake lining and clutch facing material which comprises forming a mixture of Portland cement, a friction modifying agent, fibrous material, and water in amount at least sufficient to cause setting of the cement, and fabricating said mixture into shapes adapted for use as friction elements.

14. A process of making brake lining and clutch facing material which comprises forming a mixture of Portland cement, a friction modifying agent, fibrous material in an amount not less than 10% by weight of the cement, and water in amount at least sufficient to cause setting of the cement, and fabricating said mixture into shapes adapted for use as friction elements.

15. A process of making brake lining and clutch facing material which comprises forming a mixture of Portland cement, fibrous material, and water, fabricating the mixture into a solid body having a predominating amount of the fibrous material extending in the same direction therein, cutting the resultant body into shapes adapted for use as friction elements, and associating a friction modifying agent therewith.

16. A process suitable for the manufacture of friction elements and other products which comprises forming a pulp of water, asbestos fibers, Portland cement and a waterproofing agent, and then felting the pulp into a sheet or web.

17. A process suitable for the manufacture of friction elements and other products which comprises forming a pulp of water, asbestos fibers, Portland cement and a waterproofing agent, felting the pulp into a sheet or web and winding the web into a hollow cylindrical body.

18. A friction element adapted for use as a brake lining in clutch facing comprising a hardened mass of Portland cement, a friction modifying agent, and asbestos fibers, a predominating amount of said fibers extending in the same direction in said mass.

SIMON COLLIER.
RALPH H. SOULIS.